United States Patent
Vincenti

(10) Patent No.: US 9,125,433 B2
(45) Date of Patent: Sep. 8, 2015

(54) FRUIT PITTER

(71) Applicant: Casabella Holdings, LLC, Congers, NY (US)

(72) Inventor: Neil Vincenti, Elmsford, NY (US)

(73) Assignee: CASABELLA HOLDINGS, LLC, Congers, NY (US)

( * ) Notice: Subject to any disclaimer, the term of this patent is extended or adjusted under 35 U.S.C. 154(b) by 300 days.

(21) Appl. No.: 13/768,619

(22) Filed: Feb. 15, 2013

(65) Prior Publication Data

US 2014/0230668 A1    Aug. 21, 2014

(51) Int. Cl.
| | |
|---|---|
| A23N 4/22 | (2006.01) |
| A23N 4/12 | (2006.01) |
| A23L 1/36 | (2006.01) |
| A47J 23/00 | (2006.01) |
| A23N 4/06 | (2006.01) |

(52) U.S. Cl.
CPC . A23N 4/06 (2013.01); A47J 23/00 (2013.01); *Y10T 29/4984* (2015.01)

(58) Field of Classification Search
CPC ............ A23N 4/02; A23N 4/24; A23N 4/06; A23N 5/00; A23N 5/01; A23N 4/04; A23N 4/22; A23N 4/08; A23N 4/085; A47J 23/00; A47J 25/00; A47J 43/26; A47J 43/14; A23P 1/00; A23L 1/212; A47G 19/28
USPC ................. 99/495, 537–643; 30/113.1, 113.2, 30/113.3, 358, 120.2, 120.1, 120.3, 120.4, 30/120.5; 426/478–495
See application file for complete search history.

(56) References Cited

U.S. PATENT DOCUMENTS

| | | | |
|---|---|---|---|
| 405,118 A | 6/1889 | Reibisch | |
| 578,790 A | 3/1897 | Trask | |
| 719,131 A | 1/1903 | Parker | |
| 1,357,377 A | 11/1920 | Brand | |
| 1,390,977 A | 9/1921 | Behr | |
| 1,421,333 A | 6/1922 | Wilcox | |
| 1,432,012 A * | 10/1922 | Barndt | ......................... 30/113.2 |
| 1,451,254 A * | 4/1923 | Cruzan | ........................... 99/560 |
| 1,458,163 A * | 6/1923 | Whitman et al. | ............... 99/549 |
| 1,491,968 A | 4/1924 | Plumettaz | |
| 1,509,190 A * | 9/1924 | Cook | ............................ 30/113.2 |
| 1,725,223 A * | 8/1929 | Sturges | ........................... 99/550 |
| 1,785,001 A * | 12/1930 | Duncan | ........................ 426/485 |

(Continued)

FOREIGN PATENT DOCUMENTS

| | | |
|---|---|---|
| DE | 3601079 A1 | 7/1987 |
| DE | 4104414 C1 | 5/1992 |

(Continued)

*Primary Examiner* — Dana Ross
*Assistant Examiner* — Gyounghyun Bae
(74) *Attorney, Agent, or Firm* — Curtis, Mallet-Prevost, Colt & Mosle LLP

(57) ABSTRACT

A Fruit Pitter is disclosed where a plunger and shaft are slidably disposed within a generally cylindrical barrel. The shaft contains a pit engaging end that serves to cut and push a pit through a food item and expel the pit into a pit ejection chamber. The plunger is spring actuated for ease of operation. The food item rests in an opening in the barrel and remains there throughout the pit removal operation until a user removes the food item from the Fruit Pitter. The pit ejection chamber keeps the pit retained until it can be disposed of, and further serves to reduce splattering while the Fruit Pitter is in use.

17 Claims, 10 Drawing Sheets

(56) References Cited

U.S. PATENT DOCUMENTS

| | | | | |
|---|---|---|---|---|
| 1,785,002 A | * | 12/1930 | Duncan | 99/492 |
| 1,810,954 A | * | 6/1931 | Forrest | 99/560 |
| 1,949,641 A | * | 3/1934 | Awa et al. | 99/553 |
| 2,026,806 A | * | 1/1936 | Thompson | 99/546 |
| 2,066,567 A | * | 1/1937 | Percy | 99/486 |
| 2,097,756 A | | 11/1937 | Brown | |
| 2,133,588 A | | 10/1938 | Steinwant | |
| 2,238,970 A | * | 4/1941 | Carroll | 426/231 |
| 2,243,246 A | * | 5/1941 | Carroll | 99/490 |
| 2,271,675 A | * | 2/1942 | Ashlock, Jr. | 99/544 |
| 2,402,181 A | | 6/1946 | Polk | |
| 2,463,854 A | | 3/1949 | Cowan | |
| D157,981 S | | 4/1950 | Kaveney | |
| 2,531,927 A | * | 11/1950 | Waters | 99/492 |
| 2,535,928 A | * | 12/1950 | Ives | 99/561 |
| 2,604,131 A | * | 7/1952 | Ashlock, Jr. | 99/550 |
| 2,748,818 A | * | 6/1956 | Peel | 99/514 |
| 2,775,279 A | * | 12/1956 | Perrelli | 99/551 |
| 2,788,818 A | * | 4/1957 | Skog | 99/489 |
| 2,903,031 A | | 9/1959 | Anderson | |
| 4,206,697 A | * | 6/1980 | Meissner | 99/489 |
| D265,539 S | | 7/1982 | Pavelka | |
| D317,107 S | | 5/1991 | Grass | |
| 7,549,227 B2 | | 6/2009 | De Blasis | |
| 2006/0070241 A1 | * | 4/2006 | Miller | 30/113.1 |
| 2011/0189363 A1 | | 8/2011 | Waymire | |

FOREIGN PATENT DOCUMENTS

| | | |
|---|---|---|
| FR | 2605855 A1 | 5/1988 |
| WO | WO2008014158 A2 | 1/2008 |

* cited by examiner

FRUIT PITTER

BACKGROUND OF THE INVENTION

1. Field of the Invention

This invention relates generally to food processing devices, and more specifically to a Fruit Pitter.

2. Description of Related Art

Many fruits have a stone or a pit that requires removal prior to consumption. For example, cherries, while having a delightful flavor and texture that make them well suited for raw consumption or use in prepared dishes and baked goods, have a small hard pit or stone that must be removed prior to use. Other foods, such as olives, for example, have a similar hard stone or pit that must be removed prior to use.

There are various ways to remove the pit or stone, including merely eating the food and expelling the pit while chewing the food. While this technique may be effective, it is not a particularly attractive technique, especially in more formal settings. In addition, many foods, cherries included, can be used in prepared dishes, salads, as toppings, in baked goods, and the like. In such applications, it is oftentimes desirable to not only remove the pit or stone but also to retain the basic shape of the food once the pit or stone is removed, keeping the food item basically intact. While devices for removing a pit or stone from a food item such as a fruit are known, many of these devices have shortcomings including the way in which the pit is removed, the way in which the food retains its basic shape after pit removal, the mechanism of the device, the overall shape and ease of storage of the device, and the like.

What is needed is an improved Fruit Pitter that overcomes many of these shortcomings.

It is thus an object of the present invention to provide a Fruit Pitter that retains the basic shape of the food after the pit has been removed. It is another object of the present invention to provide a Fruit Pitter with an improved mechanism. It is another object of the present invention to provide a Fruit Pitter with an improved and easy to store shape. It is yet another object of the present invention to provide a Fruit Pitter with an improved way to retain a fruit and remove the associated pit.

These and other objects of the present invention are not to be considered comprehensive or exhaustive, but rather, exemplary of objects that may be ascertained after reading this specification and claims with the accompanying drawings.

BRIEF SUMMARY OF THE INVENTION

In accordance with the present invention, there is provided a Fruit Pitter for removing a pit from a food item, the Fruit Pitter comprising a generally cylindrical hollow barrel comprising a food receiving aperture and a plunger actuation aperture; a plunger comprising a plunger body, a plunger head attached to the plunger body, and a pit removal shaft retention structure; the plunger slidably disposed within the generally cylindrical hollow barrel; a pit removal shaft comprising a pit engaging end, the pit removal shaft attached to the pit removal shaft retention structure of the plunger; a retention plate affixed within the generally cylindrical hollow barrel, the retention plate comprising a pit removal shaft opening and a spring retention tab; a spring with the pit removal shaft therethrough where the spring is placed between the plunger and the retention plate to provide return force to the plunger after the plunger has been depressed; and a pit ejection chamber attached to the generally cylindrical hollow barrel.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which.

Figure 1:
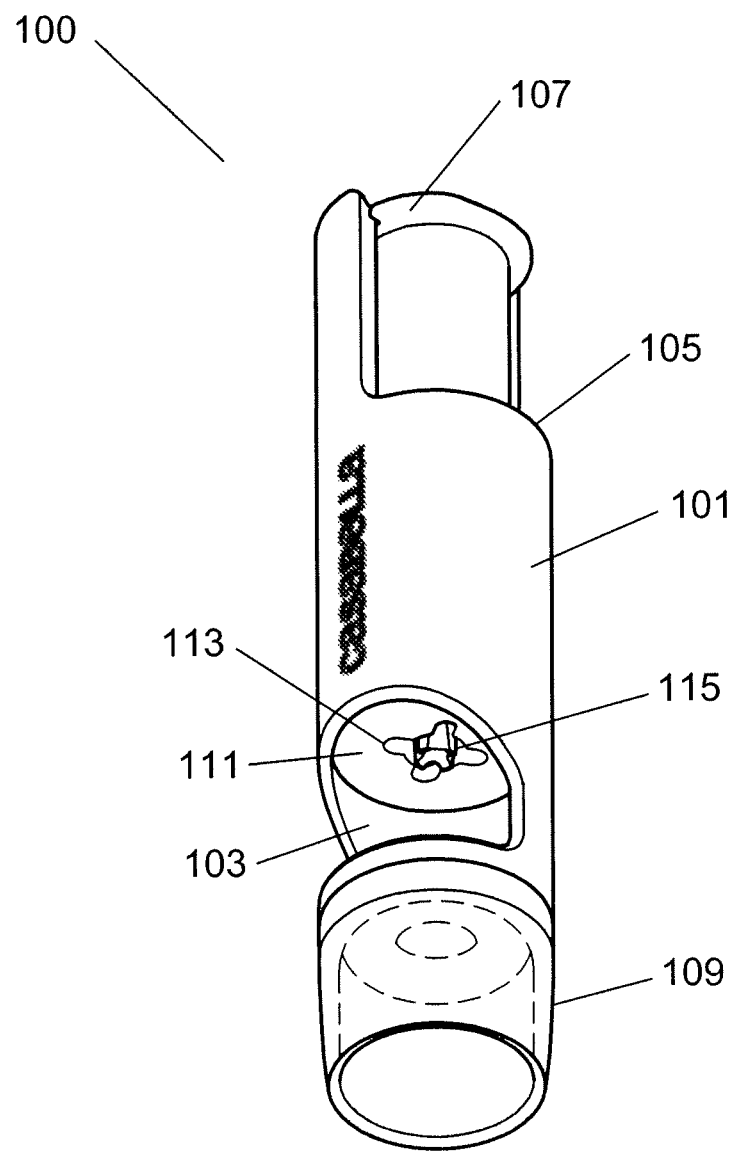
FIG. 1 is a perspective view of a Fruit Pitter of the present invention.

The attached figures depict various views of the Fruit Pitter in sufficient detail to allow one skilled in the art to make and use the present invention. These figures are exemplary, and depict a preferred embodiment; however, it will be understood that there is no intent to limit the invention to the embodiment depicted herein. On the contrary, the intent is to cover all alternatives, modifications, and equivalents as may be included within the spirit and scope of the invention as defined by this specification, claims and drawings.

DESCRIPTION OF THE PREFERRED EMBODIMENTS

A Fruit Pitter is described and depicted by way of this specification and the attached drawings. For a general understanding of the present invention, reference is made to the drawings. In the drawings, like reference numerals have been used throughout to designate identical elements.

The Fruit Pitter may be used to remove a pit or stone from a food item such as a cherry, an olive, or the like. The generally cylindrical shape of the Fruit Pitter makes for an easy to operate kitchen tool that is also convenient to clean and store. The operation is such that the Fruit Pitter may be used with one hand, and a single depression of a plunger removes and ejects a pit or stone from the food item.

FIG. 1 is a perspective view of the Fruit Pitter 100 that shows the general overall appearance and features that a user would interact with. The Fruit Pitter has a generally cylindrical hollow barrel 101 comprising a food receiving aperture 103 and a plunger actuation aperture 105. While the generally cylindrical hollow barrel 101 is depicted in the exemplary figures as cylindrical, other geometric variations may also employed, such as various polyhedra. Cylindrical, as used herein, applies to any elliptical cylinder, including, but not limited to, circular. The food receiving aperture 103 may be formed of any convenient shape that will receive a food item. The example depicted in the figures is that of an opening having a squared off bottom and a rounded and angled top with generally vertical sides. Other shapes may be envisioned after reading this specification and viewing the accompanying drawings and are to be considered within the spirit and scope of the present invention. The plunger actuation aperture 105 is a cutaway portion of the generally cylindrical hollow barrel 101 that allows a user to fully and easily depress the plunger 107. While the plunger actuation aperture 105 is depicted on the right side of the barrel 101 as shown in FIG. 1, it can also be placed on the left side of the barrel 101 (rotated 180 degrees from that depicted in FIG. 1), or rotated 90 degrees in either direction of that shown in FIG. 1, or moved in any convenient position. The barrel 101 may be made from a material such as a rigid material, for example a plastic or a metal. Examples of suitable plastics include acrylonitrile butadiene styrene (ABS), Styrene Acrylonitrile (SAN), polyethylene, polypropylene, polystyrene, polyvinyl chloride, polytetrafluoroethylene, and the like. Bioplastics may also be used in some embodiments of the present invention. In addition, reinforced plastics, metals, and other materials that may be suitably formed may also be used. The barrel 101 may be made by injection molding, blow molding, machining, or the like.

Slidably disposed within the generally cylindrical hollow barrel 101 is a plunger 107. The plunger can be seen in further detail in FIGS. 12 and 13. The plunger 107 comprises a plunger body, a plunger head attached to the plunger body, and a pit removal shaft retention structure. The plunger 107 may be made from a material such as a rigid material, for example a plastic or a metal. Examples of suitable plastics include acrylonitrile butadiene styrene (ABS), Styrene Acrylonitrile (SAN), polyethylene, polypropylene, polystyrene, polyvinyl chloride, polytetrafluoroethylene, and the like. Bioplastics may also be used in some embodiments of the present invention. In addition, reinforced plastics, metals, and other materials that may be suitably formed may also be used. The plunger 107 may be made by injection molding, blow molding, machining, or the like.

Attached to, or molded with, the barrel 101 is a pit ejection chamber 109. The pit ejection chamber 109 may be clearly seen detached from the barrel 101 in FIG. 11. The pit ejection chamber may have a circumferential edge to assist in joining the pit ejection chamber 109 to the barrel 101 should the two parts not be molded as one piece. The pit ejection chamber 109 may be made from a material such as a rigid material, for example a plastic or a metal. Examples of suitable plastics include acrylonitrile butadiene styrene (ABS), Styrene Acrylonitrile (SAN), polyethylene, polypropylene, polystyrene, polyvinyl chloride, polytetrafluoroethylene, and the like. Bioplastics may also be used in some embodiments of the present invention. In addition, reinforced plastics, metals, and other materials that may be suitably formed may also be used. The pit ejection chamber 109 may be made by injection molding, blow molding, machining, or the like. In one embodiment, the pit ejection chamber 109 is made from Styrene Acrylonitrile (SAN), an optically clear or transparent plastic that allows a user to confirm that a pit has been ejected from a food item. The pit ejection chamber 109, in one embodiment of the present invention, is generally cylindrical to align with a generally cylindrical barrel 101. As with the barrel 101, other geometric variations of the pit ejection chamber 109 may also employed, such as various polyhedra. Cylindrical, as used herein, applies to any elliptical cylinder, including, but not limited to, circular. The pit ejection chamber 109, in one embodiment of the present invention, is open on the bottom to allow an ejected pit to be removed. In addition, an open top area of the pit ejection chamber 109 allows the pit removal shaft 115 to travel through the food item completely. In some embodiments of the present invention, the pit ejection chamber 109 has a depression or otherwise concave upper surface where the food item would rest to more securely retain the food item during a pit removal operation. This depression can be seen, for example, in FIGS. 10 and 11, and can be seen in use in FIGS. 2, 3 and 4.

A retention plate 111 can also be seen in FIG. 1 affixed within the generally cylindrical hollow barrel 101. The retention plate 111 comprises a pit removal shaft opening 115 and a spring retention tab (not seen in FIG. 1, refer to FIG. 14). The retention plate 111 serves not only to stop travel of the plunger 107 and provide stability, but also serves as a backer to remove the food item from the pit removal shaft 115. The retention plate 111 may be made from a material such as a rigid material, for example a plastic or a metal. Examples of suitable plastics include acrylonitrile butadiene styrene (ABS), Styrene Acrylonitrile (SAN), polyethylene, polypropylene, polystyrene, polyvinyl chloride, polytetrafluoroethylene, and the like. Bioplastics may also be used in some embodiments of the present invention. In addition, reinforced plastics, metals, and other materials that may be suitably formed may also be used. The retention plate 111 may be made by injection molding, blow molding, machining, or the like. The retention plate 111 should preferably be of the same or similar geometry as the barrel 101. The pit removal shaft opening 113 may be any opening that accommodates travel of the pit removal shaft 115 therethrough. In one example, the pit removal shaft opening 113 is generally circular with four radial slots. The pit removal shaft 115 may be made of any rigid material, for example, stainless steel. The pit removal shaft comprises a pit engaging end that may, in some embodiments of the present invention, have additional structural features such as, for example, prongs to assist with the operation of pushing the pit through the food item and expelling the pit. The pit removal shaft 115 can be seen in use in FIGS. 3 and 4, and can be clearly seen in FIG. 11. The pit removal shaft 115 is attached to the plunger 107 by way of a pit removal shaft retention structure (not seen in FIG. 1, see FIG. 10. Not seen in FIG. 1 (see FIGS. 10 and 11) is a spring with the pit removal shaft 115 therethrough where the spring is placed between the plunger 107 and the retention plate 111 to provide return force to the plunger 107 after the plunger 107 has been depressed.

Figure 2:
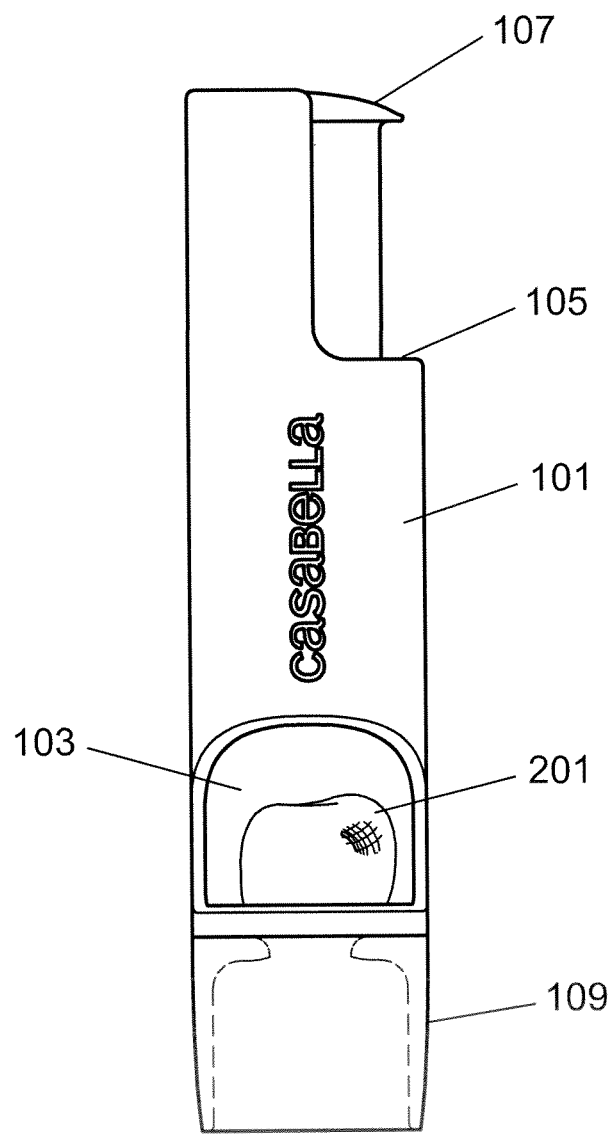
FIG. 2 is a side plan view of the Fruit Pitter in use.
Figures 3, 4:
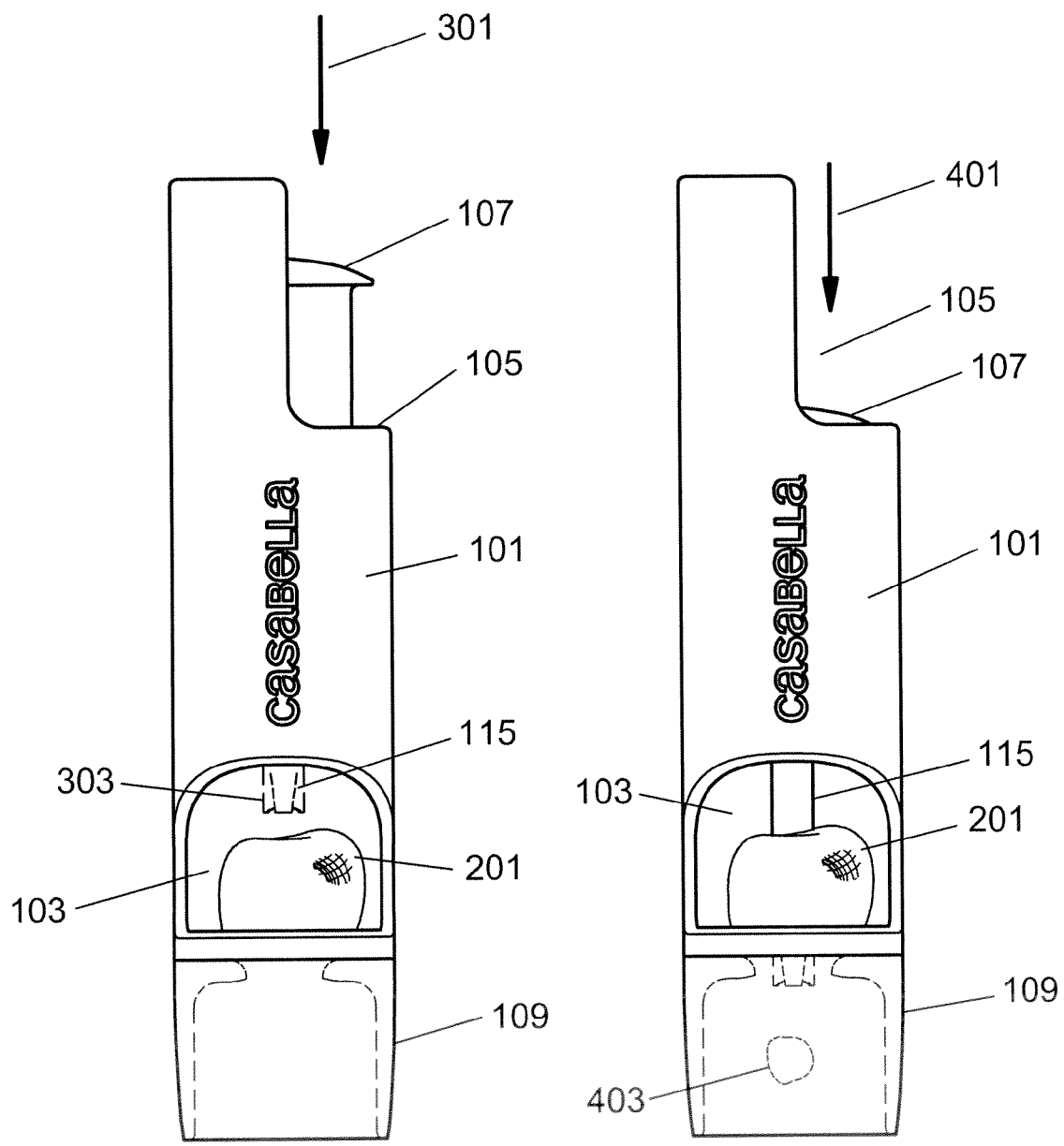
FIG. 3 is a side plan view of the Fruit Pitter in use with the plunger partially depressed.
FIG. 4 is a side plan view of the Fruit Pitter in use with the plunger fully depressed.

Turning now to FIG. 2, a side plan view of the Fruit Pitter in use is depicted. A food item 201 such as a fruit is shown in the food receiving aperture 103. To use the Fruit Pitter, a food item 201 is placed in the food receiving aperture 103 and oriented in such a way that the pit is generally centered below the pit removal shaft 115. FIG. 3 is a side plan view of the Fruit Pitter in use with the plunger partially depressed. The food item 201 can be seen properly oriented in the food receiving aperture 103 and below the pit removal shaft 115. The pit engaging end 303 can also be seen in FIG. 3. The direction of travel 301 of the plunger 107 can be seen in FIG. 3, as indicated by an arrow. As the plunger 107 is depressed by the user using a thumb or finger, the pit removal shaft 115 travels downward toward the food item 201, enters the food item 201, and pushes the pit through the food item 201 and out of the food item 201 into the pit ejection chamber 109. FIG. 4 is a side plan view of the Fruit Pitter in use with the plunger 107 fully depressed and the direction of travel 401 of the plunger 107 indicated by an arrow. The pit 403 can be seen ejected from the food item 201 and falling through the pit ejection chamber 109. The pit removal shaft 115 can also be seen penetrating through the food item 201.

Figure 5:
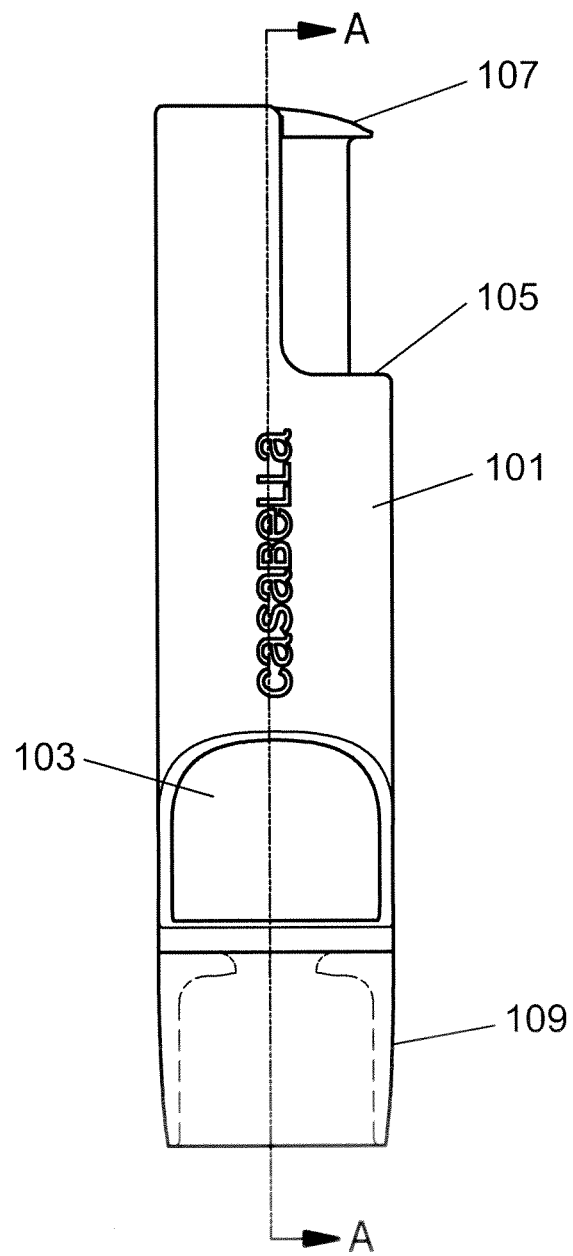
FIG. 5 is a side plan view of the Fruit Pitter.

FIG. 5 is a side plan view of the Fruit Pitter that shows the plunger 107 exposed in the plunger actuation aperture 105. The general internal outline of the pit ejection chamber 109 can also be seen in dotted line form.

Figure 6:
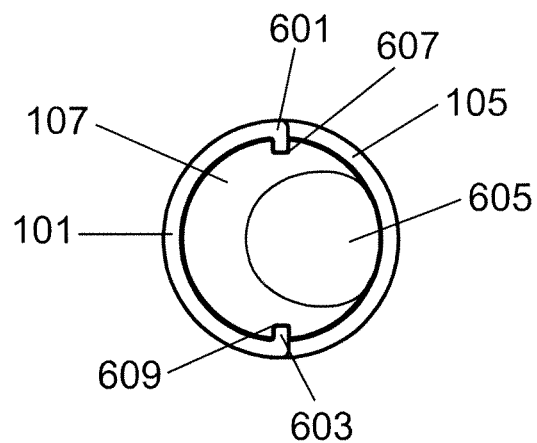
FIG. 6 is top plan view of the Fruit Pitter.
Figures 8, 9:
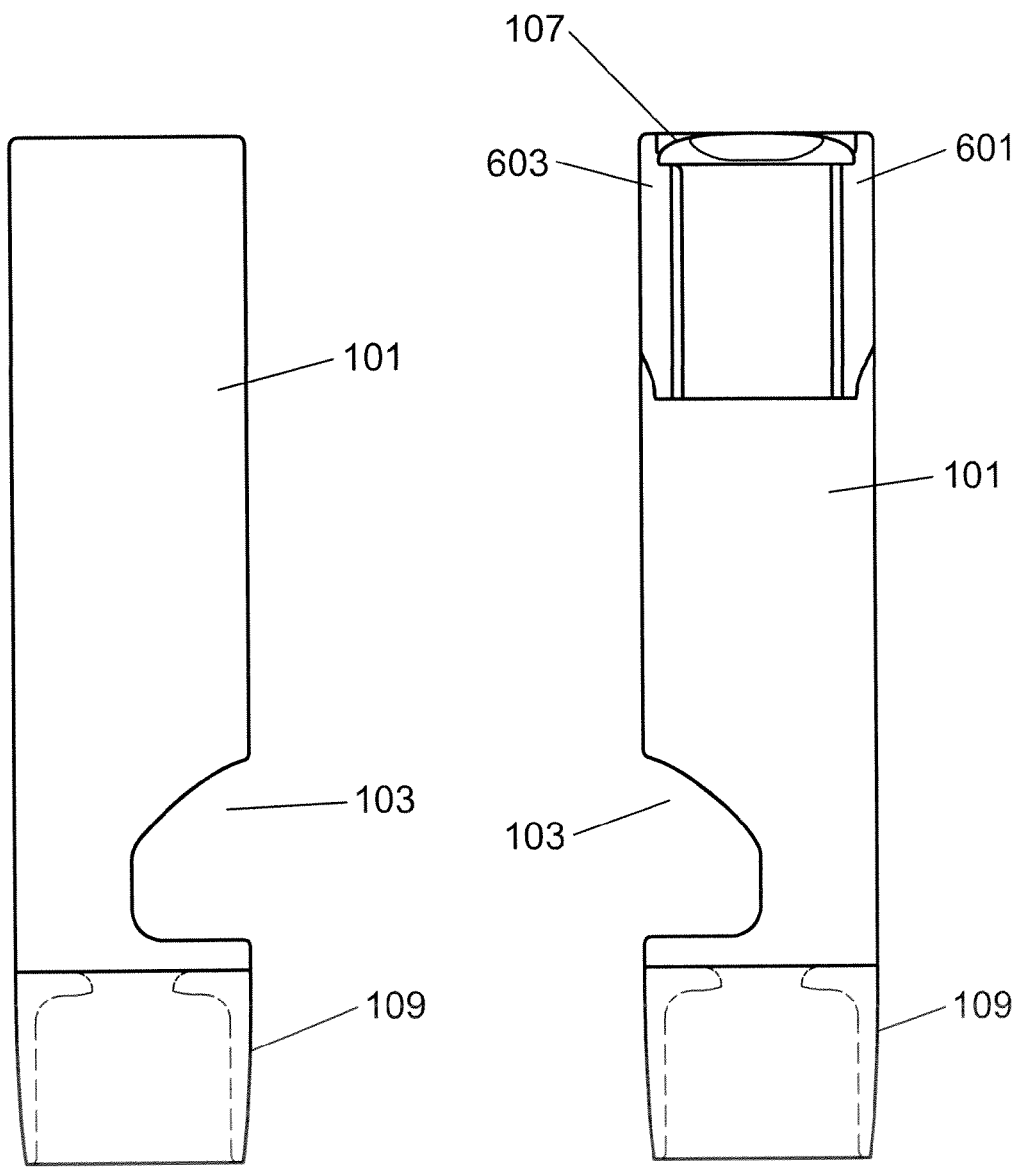
FIG. 8 is a rotated side plan view of the Fruit Pitter.
FIG. 9 is a rotated side plan view of the Fruit Pitter showing the plunger.

FIG. 6 is a top plan view of the Fruit Pitter that depicts the generally cylindrical hollow barrel 101 and the plunger 107 slidably disposed within. In some embodiments of the present invention, a depression 605 serves to provide more secure finger or thumb placement. The top edge of the barrel 101 in FIG. 1 is at two different elevations, the lower being to the right side of the drawing as a result of the plunger actuation aperture 105. A first guide rail 601 and a second guide rail 603 can be seen axially disposed adjacent to the plunger actuation aperture 105. FIG. 9 shows the first guide rail 601 and the second guide rail 603 and their axial orientation with respect to the axis of the barrel 101. In some embodiments of the present invention, the first guide rail 601 and the second guide rail 603 are rectangular protrusions from the inner circumferential wall of the barrel 101. The plunger 107 has a first upper slot 607 and a second upper slot 609 each of which is circumferentially located on the plunger head (1201 in FIG. 12) and tend to align with their respective guide rails; the first upper slot 607 aligned with and capable of traveling along the first guide rail 601, and the second upper slot 609 aligned with and capable of traveling along the second guide rail 603. This guiding arrangement serves to retain the plunger 107 within the barrel 101 and also reduces or eliminates unnecessary radial travel of the plunger 107, which would be detrimental to the pitting operation.

Figure 7:
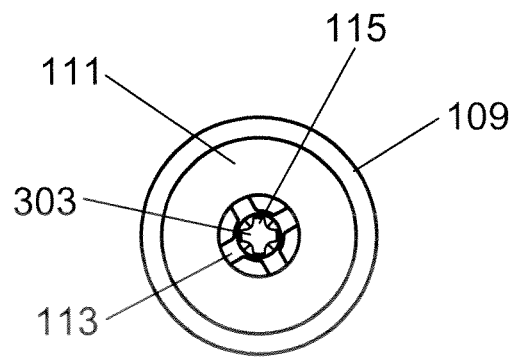
FIG. 7 is a bottom plan view of the Fruit Pitter.

Now turning to FIG. 7, a bottom plan view of the Fruit Pitter is shown. The bottom edge of the pit ejection chamber 109 can be seen along with the retention plate 111. The example depicted in FIG. 7 shows that the pit removal shaft opening of the retention plate is generally circular with four radial slots. The pit removal shaft opening 113 may also be any opening that accommodates travel of the pit removal shaft 115 therethrough. The pit engaging end 303 of the pit removal shaft 115 can be seen as well.

FIG. 8 is a rotated side plan view of the Fruit Pitter that shows the general internal outline of the pit ejection chamber 109 in dotted line form. FIG. 9 is a rotated side plan view of the Fruit Pitter showing the plunger 107 as well as the first guide rail 601 and the second guide rail 603.

Figure 10:
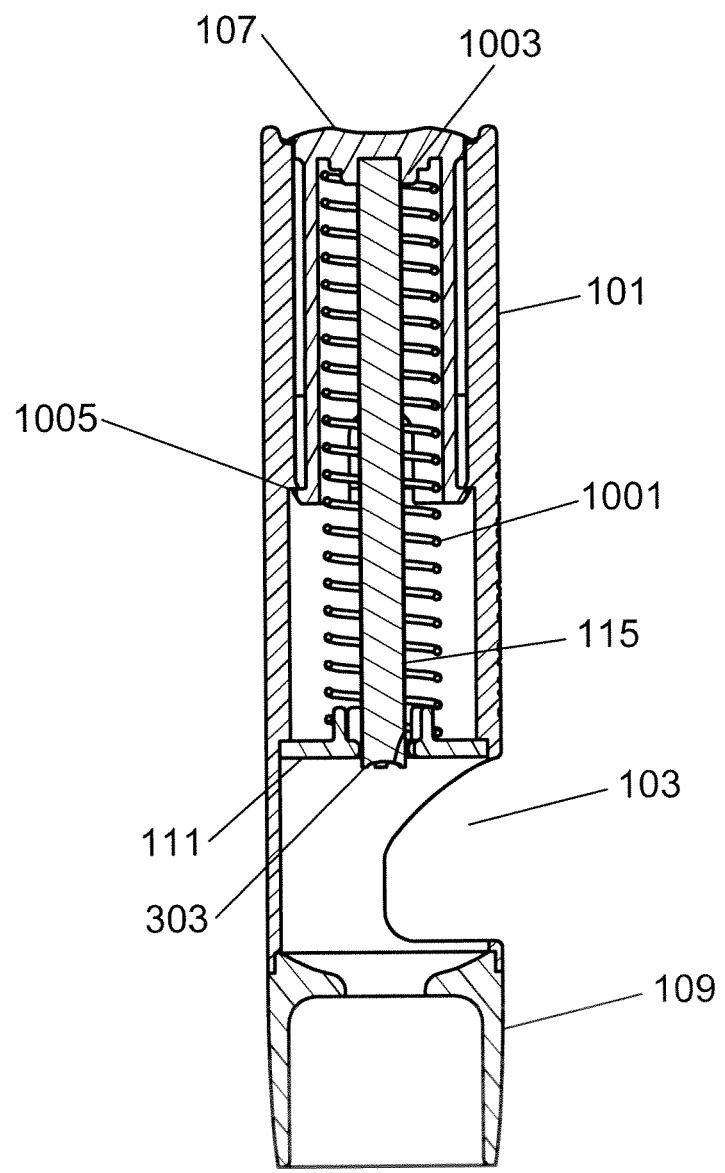
FIG. 10 is a cutaway view of the Fruit Pitter cut along line A-A of FIG. 5.

FIG. 10 is a cutaway view of the Fruit Pitter cut along line A-A of FIG. 5 that clearly shows the spring 1001 with the pit removal shaft 115 therethrough where the spring 1001 is placed between the plunger 107 and the retention plate 111. Within the plunger 107 is a pit removal shaft retention structure 1003 that has a recess to accommodate the pit removal shaft 115 and also has a built up annular retainer that serves to retain the spring 1001 within the plunger 107. The spring 1001 is preferably made from a food grade material that possesses spring like qualities. A stainless steel spring, for example, would be suitable. The spring is held by the pit removal shaft retention structure 1003 on one end and retention tabs attached to, or formed with, the retention plate 111. Details of the pit ejection chamber 109 can also be seen. Within the hollow inner surface of the barrel 101 a transition feature 1005 can be seen. The transition feature 1005 is a ridge, bump, ring, notch, or other such structure that acts as a stop for the plunger 107 and also serves to assist with the assembly and manufacture of the Fruit Pitter, as will be later described herein. The transition feature 1005 may also be a transition or change in inner radius of the barrel 101, and may be molded or otherwise integrated with the barrel 101.

Figure 11:
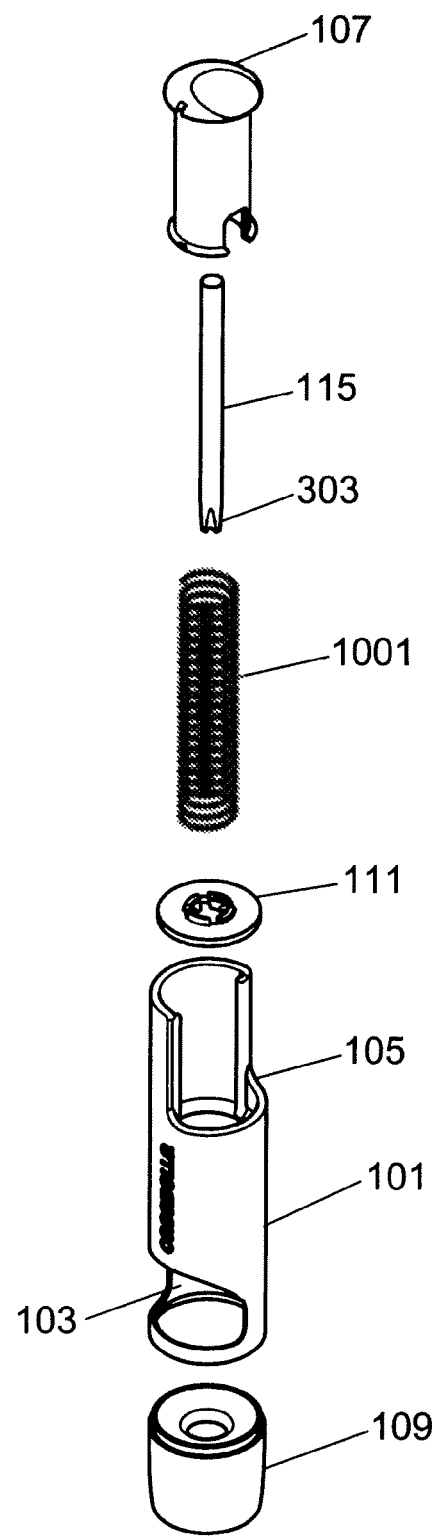
FIG. 11 is an exploded perspective view of the Fruit Pitter.

FIG. 11 is an exploded perspective view of the Fruit Pitter of the present invention. Each of the components of the Fruit Pitter can be clearly seen along with their relative locations with respect to each other.

Figure 12:
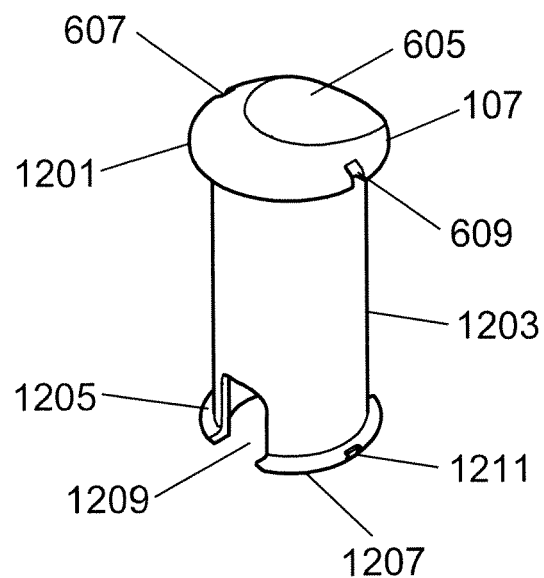
FIG. 12 is a perspective view of the plunger of the Fruit Pitter.

FIG. 12 is a perspective view of the plunger of the Fruit Pitter. In addition to a first upper slot 607 and a second upper slot 609, in some embodiments of the present invention a first lower slot 1211 and a second lower slot 1303 (see FIG. 13) are also present on the plunger 107. The first lower slot 1211 and the second lower slot 1303 are each circumferentially located on the plunger body 1203, the first lower slot 1211 being slidably engaged with the first guide rail 601 of the barrel 101 and the second lower slot 1303 being slidably engaged with the second guide rail 603 of the barrel 101. The plunger 107 comprises a plunger body 1203 and a plunger head 1201 attached to the plunger body 1203. The plunger body 1203 has a first flex opening 1209 and a second flex opening 1301 (see FIG. 13). The flex opening may be a rectangular, square, oval, or other geometric opening in the plunger body 1203 that allows the plunger body to deform during assembly. The deformation may serve to reduce the radius of the plunger body 1203 so that it can be inserted into the barrel 101 and past the transition feature 1005, after which it returns to it's pre-deformation shape and is held in place. A first flange half 1207 and a second flange half 1205 are formed between the first flex opening 1209 and the second flex opening 1301 and serve to stop the travel of the plunger 107 at the transition feature 1005 and also to guide the plunger 107 within the barrel 101.

Figure 13:
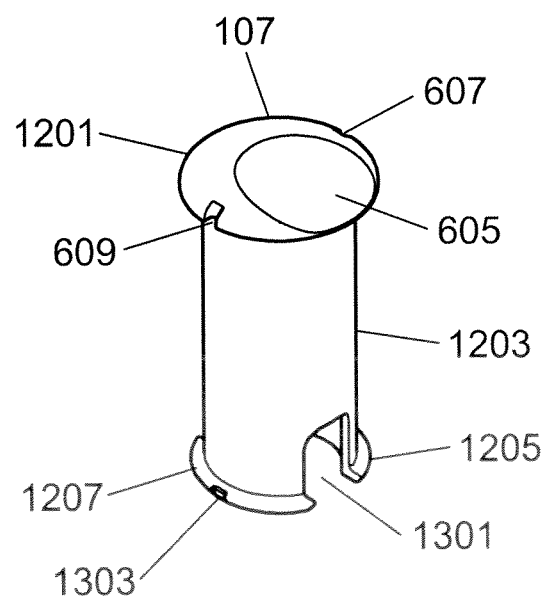
FIG. 13 is a rotated perspective view of the plunger of the Fruit Pitter.

FIG. 13 is a rotated perspective view of the plunger of the Fruit Pitter showing the second flex opening 1301 and the second lower slot 1303.

Figure 14:
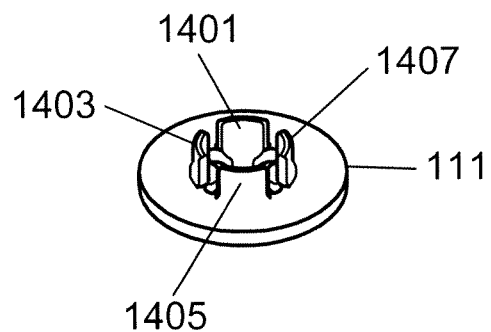
FIG. 14 is a top perspective view of the retention plate of the Fruit Pitter.

FIG. 14 is a top perspective view of the retention plate 111 of the Fruit Pitter showing the first spring retention tab 1401, the second spring retention tab 1403, the third spring retention tab 1405 and the fourth spring retention tab 1407. In some embodiments of the present invention, more or less retention tabs may be used. The retention tabs may have a curvature to more positively engage the spring 1001.

Figure 15:
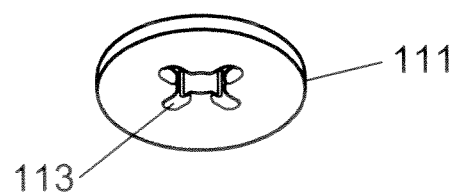
FIG. 15 is a bottom perspective view of the retention plate of the Fruit Pitter.

Lastly, FIG. 15 is a bottom perspective view of the retention plate of the Fruit Pitter showing the pit removal shaft opening 113. The pit removal shaft opening 113 may be any opening that accommodates travel of the pit removal shaft 115 therethrough. In one example, and as depicted in FIG. 15, the pit removal shaft opening 113 is generally circular with four radial slots.

To manufacture the Fruit Pitter once each of the individual parts described herein have been fabricated, a pit removal shaft 115 is affixed to the plunger 107 by press fitting, gluing, threading, or the like. A spring 1001 is then placed around the pit removal shaft 115. A pit ejection chamber 109 is then joined or formed with a generally cylindrical hollow barrel 101. A retention plate 111 is joined to an inner surface of the generally cylindrical hollow barrel 101 by press fitting, gluing, welding, or the like. The plunger 107 is then pushed inside the generally cylindrical hollow barrel 101 such that the plunger 107 deforms slightly through a reduction in radius caused by a flex opening in the plunger 107 and is retained by a transition feature 1005 inside the generally cylindrical hollow barrel 101.

To use the Fruit Pitter, a food item is placed in the food receiving aperture 103 and oriented in such a way that the pit is generally centered below the pit removal shaft 115. As the plunger 107 is depressed by the user using a thumb or finger, the pit removal shaft 115 travels downward toward the food item, enters the food item, and pushes the pit through the food item and out of the food item into the pit ejection chamber 109. Once the pit is removed, the user relieves pressure on the plunger 107, and the plunger 107 returns to its upward position by way of a spring 1001, and in doing so the pit removal shaft 115 is removed from the food item. The food item can then be removed from the food receiving aperture 103 for consumption or further processing.

It is, therefore, apparent that there has been provided, in accordance with the various objects of the present invention, a Fruit Pitter. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and the attached drawings.

What is claimed is:

1. A Fruit Pitter for removing a pit from a food item, the Fruit Pitter comprising:
   a generally cylindrical hollow barrel comprising a food receiving aperture and a plunger actuation aperture;
   a plunger comprising a plunger body, a plunger head attached to the plunger body, and a pit removal shaft retention structure; the plunger slidably disposed within the generally cylindrical hollow barrel;
   a pit removal shaft comprising a pit engaging end, the pit removal shaft attached to the pit removal shaft retention structure of the plunger;
   a retention plate affixed within the generally cylindrical hollow barrel, the retention plate comprising a pit removal shaft opening and a spring retention tab;
   a spring with the pit removal shaft therethrough where the spring is placed between the plunger and the retention plate to provide return force to the plunger after the plunger has been depressed; and
   a pit ejection chamber attached to the generally cylindrical hollow barrel.

2. The Fruit Pitter of claim 1, wherein the generally cylindrical hollow barrel further comprises a first guide rail and a second guide rail axially disposed adjacent said plunger actuation aperture.

3. The Fruit Pitter of claim 2, wherein the plunger further comprises a first upper slot and a second upper slot each of which are circumferentially located on the plunger head, the first upper slot slidably engaged with the first guide rail of the generally cylindrical hollow barrel and the second upper slot slidably engaged with the second guide rail of the generally cylindrical hollow barrel.

4. The Fruit Pitter of claim 1, wherein the generally cylindrical hollow barrel further comprises a transition feature circumferentially disposed within said generally cylindrical hollow barrel.

5. The Fruit Pitter of claim 1, wherein the plunger further comprises a depression located on the plunger head.

6. The Fruit Pitter of claim 1, wherein the plunger further comprises a first lower slot and a second lower slot each of which are circumferentially located on the plunger body, the first lower slot slidably engaged with the first guide rail of the generally cylindrical hollow barrel and the second lower slot slidably engaged with the second guide rail of the generally cylindrical hollow barrel.

7. The Fruit Pitter of claim 1, wherein the plunger further comprises a flex opening on the plunger body to allow the plunger body to deform during assembly.

8. The Fruit Pitter of claim 1, wherein the plunger further comprises a first flex opening and a second flex opening each of which are located on the plunger body, and a first flange half and a second flange half formed between the first flex opening and the second flex opening.

9. The Fruit Pitter of claim 1, wherein the plunger further comprises a first flex opening and a second flex opening each of which are located on the plunger body, and a first flange half and a second flange half formed between the first flex opening and the second flex opening, a first lower slot circumferentially located on the first flange half and a second lower slot circumferentially located on the second flange half, the first lower slot slidably engaged with the first guide rail of the generally cylindrical hollow barrel and the second lower slot slidably engaged with the second guide rail of the generally cylindrical hollow barrel.

10. The Fruit Pitter of claim 1, wherein the spring is retained by both the pit removal shaft retention structure and the spring retention tab of the retention plate.

11. The Fruit Pitter of claim 1, wherein the retention plate is cylindrical.

12. The Fruit Pitter of claim 1, wherein the retention plate further comprises a second spring retention tab, a third spring retention tab, and a fourth spring retention tab.

13. The Fruit Pitter of claim 1, wherein the pit removal shaft opening of the retention plate is generally circular with four radial slots.

14. The Fruit Pitter of claim 1, wherein the pit engaging end of the pit removal shaft comprises four prongs.

15. The Fruit Pitter of claim 1, wherein the pit ejection chamber has a concave upper surface to retain a food item.

16. The Fruit Pitter of claim 1, wherein the pit ejection chamber is made from a generally transparent material.

17. A Fruit Pitter for removing a pit from a food item, the Fruit Pitter comprising:
   a hollow barrel having a food receiving aperture and a plunger slidably disposed within the hollow barrel;
   a pit removal shaft attached to the plunger wherein the pit removal shaft comprises a pit engaging end;
   a spring with the pit removal shaft therethrough to provide return force to the plunger after the plunger has been depressed; and
   a pit ejection chamber cylindrically attached under the food receiving aperture of the hollow barrel to receive a pit that has been removed from a food item.

* * * * *